March 6, 1973  J. V. DIERINGER  3,719,281

MULTIPLE APPLICATION SEALING MEANS FOR FLUID FILTERS

Filed April 12, 1971

INVENTOR
James V. Dieringer
ATTORNEY
Thomas E Torphy

United States Patent Office 3,719,281
Patented Mar. 6, 1973

3,719,281
MULTIPLE APPLICATION SEALING MEANS
FOR FLUID FILTERS
James V. Dieringer, Racine, Wis., assignor to
Tenneco Inc., Racine, Wis.
Filed Apr. 12, 1971, Ser. No. 133,109
Int. Cl. B01d 27/00
U.S. Cl. 210—440                                    7 Claims

ABSTRACT OF THE DISCLOSURE

Disposable spin-on fluid fuel filter assemblies are made adaptable to fuel filter bases having threaded attachment posts of varying diameters and lengths by providing the filter element with resilient self-centering sealing means immediately adjacent the end of the threaded attachment post. Upon installation of the filter assembly onto a suitable filter base the conical seal is forced into and maintained in sealing engagement with the end of the attachment post by the element hold-down spring normally provided in spin-on filter assemblies.

BACKGROUND OF THE INVENTION

This invention relates to improved sealing means for fluid fuel filter assemblies of the disposable spin-on type.

Disposable fluid fuel filters of the spin-on type are widely used in conjunction with internal combustion engines which power road vehicles, such as trucks, and off-the-road and industrial equipment. Fuel filters are often necessary to assure efficient operation of internal combustion engines, particularly diesel engines, which are equipped with fuel injection equipment.

Engines equipped with fuel injectors require very clean fuel to assure proper operation of the fuel injectors. Therefore, fuel supplies for engines equipped with fuel injectors are often passed through a series of two filters prior to being admitted into the fuel injection equipment. The first filter in this series of two filters is generally called the primary filter. The primary filter is designed to remove relatively large particles from the fuel supply. The second fuel filter in such a series is commonly called the secondary or final filter. This secondary or final filter usually has a very efficient filter media which removes all particles larger than a specified limit, such as five microns, from the fuel supply.

To assure maximum efficiency of the secondary filters in such fuel systems, effective sealing of the filter to the filter base is essential. Achievement of effective sealing in prior art secondary fuel filter elements has been difficult to achieve, not always reliable, and often costly, due in large measure to the existence of non-standard spin-on fuel filter attachment posts or studs provided on filter bases from different manufacturing sources. The threaded attachment posts or studs which engage the threaded attachment hole in the attachment plate provided on the filter vary in diameter, thread size, and length.

This variance in the size of the attachment post has required the use of a great variety of different filter models each designed to properly mate with a different filter base.

SUMMARY OF THE INVENTION

This invention enables manufacture of one basic spin-on fuel filter assembly in which only a specific attachment plate need be incorporated during manufacture to accommodate nearly all fuel filter base attachment posts.

A self-centering cone shape seal incorporated into the end cap of the filter element at the end adjacent the attachment plate of the spin-on filter assembly coacts with the end of the attachment post provided on the filter base to effectively assure that all fuel flowing through the filter must pass through the filter media and be filtered. During installation of the filter onto a filter base the conventional element hold-down spring provided in spin-on filters forces the seal into sealing engagement with the end of the filter base attachment post regardless of the posts diameter or length, within a reasonable range of variance, of course.

DETAILED DESCRIPTION OF THE INVENTION

Figure 1:
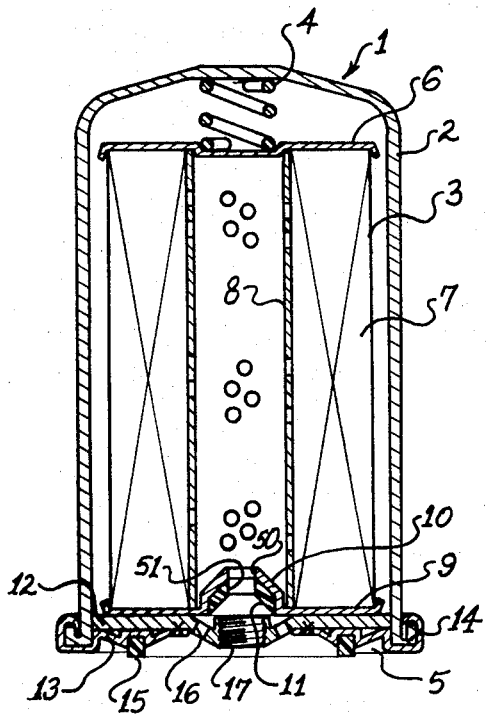
FIG. 1 is a full sectional view of a spin-on type fuel filter having a structure as disclosed herein.

FIG. 1 shows a spin-on fuel filter 1 having the improved sealing means of this invention. This filter is comprised of a filter shell 2, a filter element 3 and element hold-down spring 4 contained within the shell, and unit end cap assemby 5.

The filter element 3 is comprised of element end cap 6, filter media, in this case pleated paper 7, perforated center tube 8, and an end cap 9 having an integral seal retainer 10 formed therein. A truncated cone shaped, and therefore self-centering, resilient seal 11 is shown in its normal position within the seal retainer 10. Seal 11 has a central flow passage 51 for communication to the interior of filter element 3 through passage 50 in seal retainer 10. Seal retainer 10 may be made as a separate stamping which sealingly coacts with end cap 9, but having retainer 10 formed as an integral feature of end cap 9 as herein described is the preferred embodiment.

The unit end cap assembly 5 is comprised of attachment plate 12, unit end cap 13 which is attached to the filter shell 12 by lockseam, 14, and annular, resilient gasket 15.

Attachment plate 12 is spot welded to unit end cap 13 where indicated by convention on the drawing. Attachment plate 12 contains inlet holes 16 and threaded attachment hole 17.

Figure 2:
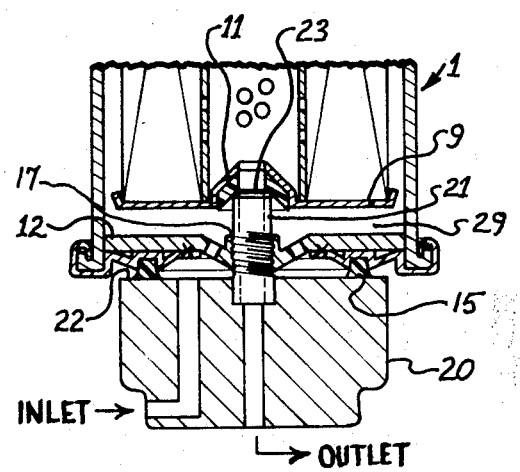
FIG. 2 is a partial sectional view showing a spin-on fuel filter as shown in FIG. 1 mounted on an illustrative filter base.

FIG. 2 is a partial sectional view of the spin-on fuel filter of FIG. 1. This figure shows the spin-on filter mounted on an illustrative base 20 and therefore shows the relationship between the end of the filter base attachment stud or post 21 and the resilient conical seal 11. As shown attachment stud 21 threadedly engages attachment hole 17 in attaching plate 12. The filter 1 is screwed onto the attachment stud 21 sufficiently far to force annular gasket 15 into sealing engagement with an appropriate surface 22 on the filter base 20. In FIG. 2 the filter is shown after having been screwed into sealing engagement with the filter base.

It will be noted that the end surface 23 of attachment stud 21 is in sealing engagement with resilient seal 11 and that end cap 9 has been pushed away from attachment plate 12 to provide a space 29 for oil flow.

Element hold-down spring 4, shown in FIG. 1, is compressed as the filter is torqued downward on the attachment stud. After the filter has been torqued sufficiently to provide a seal between annular gasket 15 and filter base surface 22, the element hold-down spring assures a continual sealing engagement between the end 23 of attachment stud 21 and the surface of resilient seal 12.

Figure 3:
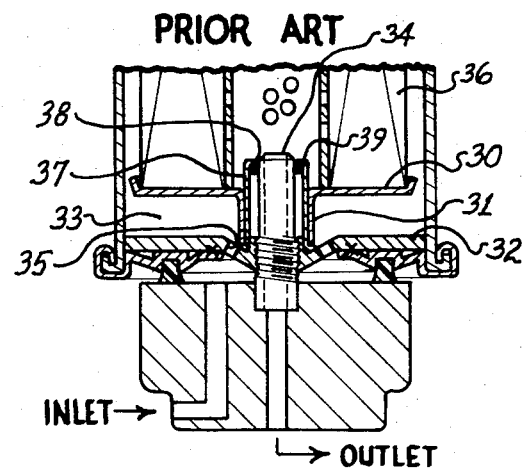
FIG. 3 is a partial sectional view of a typical prior art spin-on fuel filter shown attached to an illustrative filter base.

In prior spin-on fuel filters, such as that shown in the partial sectional view of FIG. 3, the filter end cap 30 is formed with an integral annular projection 31 which rests against the attachment plate 32 and serves to maintain the element end cap 30 away from attachment plate 32 to provide oil flow space 33. The integral annular projection 31 is commonly called a stand-off by those skilled in the filter art. To provide a seal about the attachment stud 34 and thus prevent the fuel from flowing through inlet holes 35 and between attachment plate 32 and the end of stand-off 31 to flow through the outlet passage provided in the attachment post and base without passing through the filter media 36, it has been necessary to provide a cylindrical stamping 37 formed to seat between the attachment plate and the end of the stand-off 31. This stamping 37 is coaxial about attachment stud 34 and is provided with a seal retaining lip 38. An annular resilient seal 39 such as an O-ring has been placed within the stamping to provide a seal between the stamping and the outer surface of attachment stud 34. This seal is intended to prevent undesirable by-passing of the filter media by fuel to be filtered.

Several disadvantages result from this construction. One is that the O-ring may not contact the surface of the attachment stud properly during installation of the filter upon the base. If the O-ring becomes tipped in retainer stamping 37 it may not provide a seal and would therefore allow undesirable by-passing of the filter media by the fuel. Additionally, a separate size stamping and O-ring seal is required for each diameter of attachment stud. Therefore, during manufacture a great variety of different size stampings 37 and O-rings 39 are required to accommodate the variety of attachment studs present on filter bases provided on engines produced by different manufacturers.

However, with the seal of this invention only a variety of attachment plates 12 provided with attachment holes 17 of FIG. 2 having appropriate diameters and thread sizes designed to accommodate specific filter base attachment posts is necessary.

The conical resilient seal 11 can accommodate attachment studs having different diameters and still effect a seal. Also, regardless of its length, the attachment stud itself serves as the stand-off holding the element end cap 9 away from attachment plate 12 to provide oil flow space 29 as shown in FIG. 2.

Figure 4:
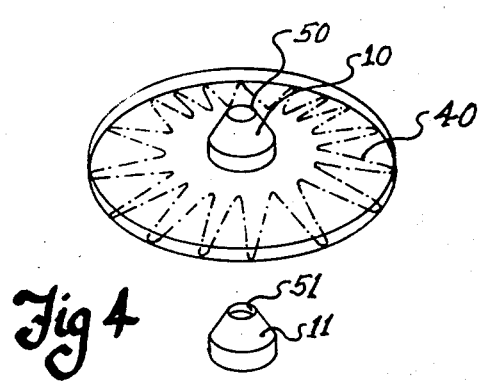
FIG. 4 is a perspective view showing certain elements of the filter shown in FIG. 1.

In FIG. 4 the element end cap of this invention is shown in perspective with integral seal retainer 10 formed therein. Also shown is resilient seal 11 prior to its placement in seal retainer 10. The phantom lines 40 illustrate how the end of pleated paper media 7 in FIG. 1 contact the element end cap 9. The opening 50 in seal retainer 10 and the opening 51 in seal 11 provide fluid flow passages enabling the filtered fluid to flow through openings 50 and 51 and through a passage in attachment post 23 which communicates with the outlet passage in the filter base.

The use of a substantially cone shaped, self-centering seal as shown in FIGS. 1, 2, and 4 is preferred but seals of other configurations such as seals of flat, semi-spherical, or of an inverted cone configuration, or combinations thereof, could also be used to practice this invention.

What is claimed is:

1. In a filter assembly comprising a shell, a filter element assembly including a filter element and a filter element hold-down spring, and a unit end cap assembly, the improvement comprising:

(a) resilient seal means for being urged into sealing engagement with the end of a filter attachment post upon installation of said filter assembly onto a suitable filter base;
(b) said seal means having a fluid flow passage communicating with one side of said filter element;
(c) said seal means being engaged with said filter element assembly adjacent said unit end cap assembly of said filter assembly;
(d) said filter element assembly having a fluid flow passage communicating with said fluid flow passage in said seal means; and
(e) said fluid flow passage of said seal means being substantially coaxial with an attachment opening in the filter assembly unit end cap assembly.

2. A filter assembly as defined in claim 1 in which said seal means is substantially cone shaped.

3. A filter assembly as defined in claim 1 in which said filter element assembly and seal means have a degree of freedom of movement lateral to the axis of said attachment post so that said seal means is self-centering in relation to the end of said attachment post.

4. In a filter assembly comprising a cylindrical shell, an attachment plate attached to one end of said shell and having an attachment opening, a cylindrical filter element assembly axially movable within said shell and including a filter element end cap at one end thereof, and a filter element hold-down compression spring exerting force on the end of said filter element opposite said end cap, the improvement comprising:

(a) resilient seal means for sealing engagement with the end of a filter attachment post when said filter assembly is installed on a filter base; and
(b) seal retaining means for retaining said seal means;
(c) said seal means having a fluid flow passage; and
(d) said seal retaining means being engaged with said filter element end cap adjacent said attachment plate;
(e) said seal retaining means having a fluid flow passage communicating with said fluid flow passage in said seal means; and
(f) said seal means being retained with said fluid flow passage substantially coaxial with said attachment opening in said filter attachment plate.

5. A filter assembly as defined in claim 4 in which said filter element assembly and seal means having a degree of freedom of movement lateral to the axis of said attachment post so that said seal means is self-centering in relation to the end of said attachment post.

6. A filter assembly as defined in claim 4 in which said seal retaining means is formed integral with said end cap.

7. A filter assembly as defined in claim 4 in which said seal means is substantially cone shaped to form a substantially cone shaped concavity for receiving and sealingly engaging attachment posts of various diameters.

References Cited

UNITED STATES PATENTS

| | | | |
|---|---|---|---|
| 2,877,902 | 3/1959 | Chase et al. | 210—440 |
| 2,568,196 | 9/1951 | Kennedy | 210—440 |
| 2,076,936 | 4/1937 | Burckhalter | 210—440 X |

REUBEN FRIEDMAN, Primary Examiner

R. W. BURKS, Assistant Examiner

U.S. Cl. X.R.

210—DIG 17